United States Patent
Breuer et al.

(10) Patent No.: US 11,089,526 B2
(45) Date of Patent: Aug. 10, 2021

(54) METHOD FOR OPERATING A WIRELESS DEVICE IN A SELECTED RADIO ACCESS NETWORK

(71) Applicant: GEMALTO M2M GmbH, Munich (DE)

(72) Inventors: Volker Breuer, Bötzow (DE); Thomas Ulrich, Bad Dürkheim (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 22 days.

(21) Appl. No.: 15/104,292

(22) PCT Filed: Dec. 1, 2014

(86) PCT No.: PCT/EP2014/076055
§ 371 (c)(1),
(2) Date: Jun. 14, 2016

(87) PCT Pub. No.: WO2015/090912
PCT Pub. Date: Jun. 25, 2015

(65) Prior Publication Data
US 2016/0316407 A1    Oct. 27, 2016

(30) Foreign Application Priority Data
Dec. 17, 2013  (EP) ..................... 13197818

(51) Int. Cl.
*H04W 36/14*  (2009.01)
*H04W 36/24*  (2009.01)
(Continued)

(52) U.S. Cl.
CPC ........... *H04W 36/14* (2013.01); *H04W 36/24* (2013.01); *H04W 48/16* (2013.01); *H04W 76/30* (2018.02); *H04W 36/36* (2013.01); *H04W 76/10* (2018.02)

(58) Field of Classification Search
CPC ..... H04W 36/14; H04W 36/24; H04W 36/36; H04W 76/06; H04W 48/16; H04W 76/30; H04W 76/10
See application file for complete search history.

(56) References Cited

U.S. PATENT DOCUMENTS

2005/0192009 A1    9/2005  Shaheen et al.
2007/0184835 A1    8/2007  Bitran et al.
(Continued)

OTHER PUBLICATIONS

International Search Report (PCT/ISA/210) dated Feb. 19, 2015, by the European Patent Office as the International Searching Authority for International Application No. PCT/EP2014/076055.
(Continued)

*Primary Examiner* — Marcos L Torres
(74) *Attorney, Agent, or Firm* — Buchanan Ingersoll & Rooney PC

(57) ABSTRACT

Disclosed is a method to operate a wireless device, comprising a communication unit, in a wireless cellular network comprising at least two radio access networks, the communication unit being configured to communicate to a network node of the wireless cellular network, the network node being associated to a first radio access network. The method comprises the steps for the communication unit of: detecting if a second radio access network of said wireless cellular network fulfills a predefined set of access parameters, wherein the second radio access network supports a different access technology than the first radio access network. If the second radio access network fulfills said set of access parameters: sending a connection release indication to the network node, receiving from the network node a connection release confirmation message, sending a connection request message to the wireless cellular network with selection of said second radio access network.

9 Claims, 3 Drawing Sheets

(51) Int. Cl.
　　　*H04W 48/16*　　(2009.01)
　　　*H04W 76/30*　　(2018.01)
　　　　H04W 36/36　　(2009.01)
　　　　H04W 76/10　　(2018.01)

(56) References Cited

U.S. PATENT DOCUMENTS

| | | | |
|---|---|---|---|
| 2011/0105200 A1* | 5/2011 | Tomita | H04W 52/0241 |
| | | | 455/574 |
| 2013/0017820 A1* | 1/2013 | Drazynski | H04W 48/16 |
| | | | 455/422.1 |
| 2013/0078980 A1 | 3/2013 | Saito | |
| 2015/0024787 A1* | 1/2015 | Ben-Itzhak | H04L 12/18 |
| | | | 455/456.4 |
| 2016/0242116 A1* | 8/2016 | Masuda | H04W 16/32 |

OTHER PUBLICATIONS

Written Opinion (PCT/ISA/237) dated Feb. 19, 2015, by the European Patent Office as the International Searching Authority for International Application No. PCT/EP2014/076055.
Quoc-Thinh Nguyen-Vuong et al., "Terminal-Controlled Mobility Management in Heterogeneous Wireless Networks", IEEE Communications Magazine, vol. 45, No. 4, Apr. 1, 2007, pp. 122-129, XP-011176569.

* cited by examiner

METHOD FOR OPERATING A WIRELESS DEVICE IN A SELECTED RADIO ACCESS NETWORK

FIELD OF THE INVENTION

The present invention relates to a method to operate a wireless device in a wireless cellular network, the wireless device comprising a communication unit, the wireless cellular network comprising at least two radio access networks, the communication unit being configured to communicate to a network node being part of the wireless cellular network, the network node being associated to a first radio access network.

The invention also pertains to a wireless device using said method.

BACKGROUND OF THE INVENTION

Generally, there is an increasing interest on users of wireless devices for wireless communication to receive the maximum possible data throughput that the current wireless cellular network is able to provide. Provided that a wireless cellular network run by an operator consists from at least two radio access networks representing different access technology, it is known that not each of the radio access networks is accessible throughout the whole coverage area of the wireless cellular network. It is therefore desirable for the user to know which access technologies are available for a wireless device. A wireless device according to the known wireless standards knows only about the access technology of the radio access networks it is currently operating in. It is therefore desirable that the wireless device is operating in the radio access network providing the access technology with the best data throughput.

However, at least for wireless devices operating in connected mode the wireless cellular network is in charge to decide in which radio access network—thus in which access technology—the wireless device is operating. Background for this architecture is the need from the wireless cellular network operators to optimally use their network resources. Known solutions based on repeatedly sending Signalling Connection Release Indications (SCRI) disturb the balance within the wireless cellular networks and generate an immense overload of additional signalling.

It is therefore a goal of present invention to provide a method that allows the wireless device to decide in which radio access network it is operating without material disturbance of the wireless cellular network.

Further alternative and advantageous solutions would, accordingly, be desirable in the art.

SUMMARY OF THE INVENTION

The present invention aims to reach the addressed goal by a method to operate a wireless device according to claim 1. It also relates to a wireless device according to claim 8.

It is therefore according to a first aspect of the invention proposed a method which comprises the steps for the communication unit of the wireless device:

detecting if a second radio access network of said wireless cellular network fulfils a predefined set of access parameters,
   wherein the second radio access network supports a different access technology than the first radio access network, if the detection step indicates that said second radio access network fulfils said set of access parameters:
   sending a connection release indication to the network node,
   receiving from the network node a connection release confirmation message,
   sending a connection request message to the wireless cellular network with selection of said second radio access network.

The wireless device is a device configured to be operating in a wireless cellular network, in particular supporting wireless access technology standards defined by ETSI and 3GPP. The wireless device is equipped at least with a communication unit which handles all communication tasks in conjunction with the wireless links. Such communication unit is in particular a transceiver. It is further usually connected to an antenna which is the hardware interface to the wireless cellular network.

The wireless cellular network comprises at least two radio access networks. Those radio access networks—also known as RANs—provide the singular implementations of the different access technology standards a wireless cellular network can provide. Typically each of them provides a set of its own network nodes. Network nodes are the hardware interface of the radio access network to the wireless link. The network nodes are—depending upon the supported access technology—in particular base stations, NodeBs or eNodeBs. It is further possible that, within a wireless cellular network, the radio access networks share the locations of their network nodes, or at least of equipment of some of these network nodes. With each network node a certain area can be covered which is usually named as cell.

When a wireless device is registered in a wireless cellular network and in particular is in a connected mode, that means it can launch or accept any type of communication, then it is dedicated to one of the radio access networks. That means, at a time, a wireless device is operating within one radio access network of the wireless cellular network.

The inventive method starts from that described situation of a wireless device connected to a first radio access network. Now a second radio access network of said wireless cellular network is to be evaluated. The information on such second radio access network can be received from the first current serving radio access network via dedicated neighbor cell signalling as part of the so-called dedicated measurements control channel whilst still being in connected mode with the network node. Alternatively, when the device is in idle mode—in particular after a SCRI (Signalling Connection Release Indication) was successfully executed—the information can be retrieved by receiving the neighbor cell information from the so-called System Information Broadcast (SIB2) on a broadcast channel (BCCH). Furthermore such knowledge can comprise that the wireless device was once operating in this second radio access network of this wireless cellular network.

Now it is to be detected if the second radio access network fulfils a predefined set of access parameters. For that it is foreseen to detect characteristics of said second radio access networks and compare them with criteria under that the wireless device is ready to operate within this radio access network. Such set of access parameter typically comprise certain expected threshold values of one or more of those characteristics, in particular those indicating a certain quality of service, data throughput etc.

According to the invention, the second radio access network is only evaluated if it supports a different access technology as the first radio access network the wireless device is currently operating in.

If it is known that the wireless cellular network provides only radio access networks with different access technologies, and the detected second radio access networks is different from the first radio access network, no special evaluation step needs to be conducted. Otherwise it is necessary to detect the access technology of the second radio access network and compare it with the access technology of the first radio access network. For this also the dedicated measurement control channel can be used which also indicates the access technology of network nodes associated to other radio access networks.

If such a second radio access network is identified then, according to the invention, the wireless device decides to take measures to access this second radio access network.

In order to do so the following steps are conducted:

First a connection release indication message is send to the network node. This is a message known in the standards in particular as SCRI (Signalling Connection Release Indication). With that the wireless device can indicate to the wireless cellular network that it is not planning to continue the current connection with the current first radio access network.

As a response the network node of the first radio access networks sends a connection release confirmation message to the wireless device and cleans up resources for the connection with the wireless device. Now the wireless device is not anymore connected to the first radio access network.

Finally now the wireless device sends a connection request message to the wireless cellular network in order to set up the connection again. By doing so the wireless device is able to select to which radio access network it wants to setup the connection, in this case the detected second radio access network which fulfils the set of access parameters. One preferred way of selecting the envisaged second radio access network is by accessing a network node which is associated to the second radio access networks.

After the inventive method is executed, the wireless device is operating in a radio access network which fulfills the predefined set of access parameter.

One trigger to launch the inventive method is the detection that—in particular during a connection—the wireless cellular network shifted the wireless device to a radio access network which does not fulfill the predefined set of access parameters.

The method is advantageous as it avoids a lot of signalling within the wireless cellular network as it only launches the connection release indication when it really knows that another radio access network is available where the wireless device can operate in and which fits to the needs. This saves a lot of attempts which are in vain, which also helps the wireless device to save energy and provide a continuous connection, even if not operating in a desired radio access network.

The peculiarity of present invention is that a change of radio access technology is not based on the performance of the current radio access network but on the availability and the characteristics of another.

Finally the method lays the decision to operate in which radio access network in the hands of the wireless device, as opposed to the wireless cellular network dictating the radio access network without knowing coming throughput needs.

In a further preferred embodiment it is proposed a method wherein the wireless device comprises at least one storage element storing network access rights, and wherein the set of access parameters further comprises the requirement that said network access rights indicate that:

the wireless device is entitled to access the second radio access network and/or the second radio access network is configured as preferred radio access network.

According to this embodiment it is proposed that the set of access parameters comprise certain network access rights related requirements. Such network access rights are preferably stored within a storage element included in the wireless device.

Advantageously such a storage element is a SIM card, or similar embodiments like a UICC, USIM, MIM, whereby it does not matter for this embodiment if this storage element is removable or not. Typically authentication and authorization information are stored in such a storage element. With those authentication and authorization information the wireless device can on the one hand register at wireless cellular networks, and on the other hand know which services the wireless device is entitled to. The information stored on the storage element is preferably part of a subscription of the owner of the wireless device resp. the storage element. This means that at least parts of information are also available at the site of the operator of the wireless cellular network.

In this embodiment it is as one option stored in the storage element the information if the second radio access network can be accessed by the wireless device or not. It may be the case that the second radio access network provides a service according to the newest generation access technology, in particular 4G resp. LTE (long term evolution), but the network access rights according to the subscription does only allow access to access technologies below this newest generation access technology, in particular 2G and 3G.

It is therefore advantageous to prevent the wireless device from sending connection release indications once a radio access network supporting a high end access technology is available, if the wireless device is according to its subscription not allowed to access this radio access network.

It is further advantageous as a second option to identify if the radio access network is the preferred radio access network. Typically one radio access network is characterized according to the subscription as preferred radio access network. This is also visible in the stored network access rights. Therefore, according to this embodiment, it is preferable if the steps of conducting a connection release indication and the following steps, hereinafter called the RAN shift steps, are only executed when the wireless device is not operating in the radio access network which is defined as the preferred radio access network.

According to a further preferred embodiment, it is proposed a method, wherein the set of access parameters further comprises the requirement that the second radio access network is available.

That is the case if at least one network node of the second radio access network is reachable by the wireless device. It is in particular reachable, when signals of a network node associated to the second radio access network can be received and are strong enough to be decoded. It is further advantageous to consider the availability if also signaling/paging launched by the wireless device can be received and decoded at the network node. Additionally it is preferable to be checked if the second radio access network is detectable by the wireless device. It is possible that a radio access network is decodable, but the wireless device is not able to decode, as it has no resources to decode or the cell is not in the so-called detected set of cells, which is provided with said detected neighbour cell signalling.

This embodiment is advantageous to avoid any signalling with respect to the RAN shift step in case the second radio access network cannot be accessed as the wireless device is moving in an area which is not covered by network nodes associated to the second radio access network.

According to a preferred embodiment it is proposed a method wherein the availability of the second radio access network is determined by measuring signalling from network nodes associated to neighbour cells. According to the known access technology standards, network nodes of one radio access network provide information through the signalling to wireless devices concerning neighbour cells including those from different radio access networks which are read resp. decoded by the wireless devices. This method is known e.g. for LTE as automatic neighbourhood relation (ANR). Alternatively also dedicated measurement control information can be used to retrieve the necessary data concerning neighbour cells from different radio access networks.

This embodiment is advantageous as the wireless device does not have to listen to network nodes from radio access networks where it is not operating in. This allows a seamless communication within the current radio access network with a full picture of available other radio access networks.

In a preferred embodiment it is proposed a method wherein the availability of the second radio access network is determined by executing a network scan. As an alternative or additional to the previous embodiment, it is possible that the wireless device itself tries to detect through measuring of the frequency bands if other radio access networks are available. For this it is preferable to find out if those radio access networks are part of the wireless cellular network the wireless device is entitled to access. This is in particular done by decoding broadcast information provided by those radio access networks. Further those network scans are preferably done during phases with no or only low traffic with the first radio access network. It is even possible to conduct this network scan in idle mode of the wireless device.

According to another preferred embodiment, it is proposed a method comprising the step of storing measurements indicating a high likelihood of availability of a second radio access network, wherein the availability of the second radio access network is determined by accessing said stored previous measurements.

With this embodiment, measurements, in particular from embodiments concerning the availability of a radio access network mentioned before, are taken into account that have been made earlier than at the point in time of the decision to conduct the RAN shift steps.

In particular for static wireless devices it is highly likely that the situation with regards to the availability of the second radio access network has not changed. This allows decoupling the measurement steps and the decision steps for conducting the RAN shift steps.

All mentioned steps handling with the availability of the second radio access network are preferably executed in conjunction with the detection of the second radio access network. It is therefore preferable to identify first if the second radio access network is available according to one or more of the mentioned embodiments and to proceed then with the evaluation of potential other predefined access parameter.

In a further preferred embodiment it is suggested a method wherein if the detection step indicates that no second radio access network fulfils said set of access parameters, executing the steps of:

starting a timer,
measuring a first indication of the current location,
after expiry of timer measuring a second indication of the current location,
if the first and second indication of the current location materially differ,
repeating the detection step or
otherwise restarting the timer.

This embodiment copes with the situation that no second radio access network was detected which fulfills a predefined set of access parameters. After expiry of a timer of certain seconds the method starts on again. This embodiment suggests a more elaborated approach which reduces both the signalling load and performance plus energy requirements on side of the wireless device.

For that, after the detection that no second radio access network fulfils said set of access parameters a timer is started.

Additionally a first indication of the current location is measured. This can be done by a location measuring unit, like a GPS unit, incorporated in the wireless device. Also network based location measurements are known. For that the known standards allow to estimate the distance from the cell center by using CPICH_RSCP or any other corresponding pilot channel from which dBm value a distance can be derived by assuming so called LOS (line-of-sight) conditions. The accuracy of this method is sufficient for this purpose. Then after the started timer has expired a second indication of the current location is measured, preferably by the same means as the first indication of the current location.

Now it is evaluated of the two indications of the current location materially differ. This is in particular the case when according to the distance between the two indicated locations it can be expected that the cell where the wireless device was operating in during said first measurement was left.

Many criteria can be used for deducting that the indicated locations materially differ. This can be a constant minimum value, which should be higher than the accuracy range of the measurement method. This can be based on minimum or average cell size.

Alternatively for network base location measurement it can be monitored if the signal stays constant or at least within a certain range at what so ever level. This is already a good indication for not changing the distance to the cell center. This is true as the received power level of the pilot channels are emitted at fixed power and only vary with the distance to the cell center. To use more than one pilot channel is advantageous as with fixed pilot channel signal power movement on a circle around the network node would be possible. Hence with using one pilot channel a change of signal powers already indicates a movement, while no change does not necessary mean that no movement has happened.

With two signals from two network nodes there still would be the slight chance that a movement happened as there are two points having same conditions between these two cells. However when using three pilot signals the position is fixed if none of them varies more than within a small range.

The advantage of this embodiment is that no further signalling or measurement steps need to be executed by the wireless device when it is known that no second radio access network is present at this location. It does not require further measurements unless the wireless device is moving to another cell.

Together with the previously mentioned embodiments this method is well-suited to allow measurements and conducting RAN shift steps only if it is promising enough to reach a second radio access network within the wireless cellular network which fits to the needs of the wireless device.

According to a second aspect of the invention it is proposed a wireless device configured to operate in a wireless cellular network, the wireless device comprising a communication unit, the wireless cellular network comprising at least two radio access networks, the communication unit being configured to communicate to a network node being part of the wireless cellular network, the network node being associated to a first radio access network, wherein the wireless device is configured:

to detect if a second radio access network of said wireless cellular network fulfils a predefined set of access parameters, wherein the second radio access network supports a different access technology than the first radio access network, if the detection indicates that said radio second radio access networks fulfils said set of access parameters, the communication unit is configured:

to send a connection release indication to the network node, to receive from the network node a connection release confirmation to send a connection request message to the wireless cellular network with selection of said second radio access network.

The wireless device of the second aspect of the present invention shares the advantages achieved with the operating method of the first aspect of the invention.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
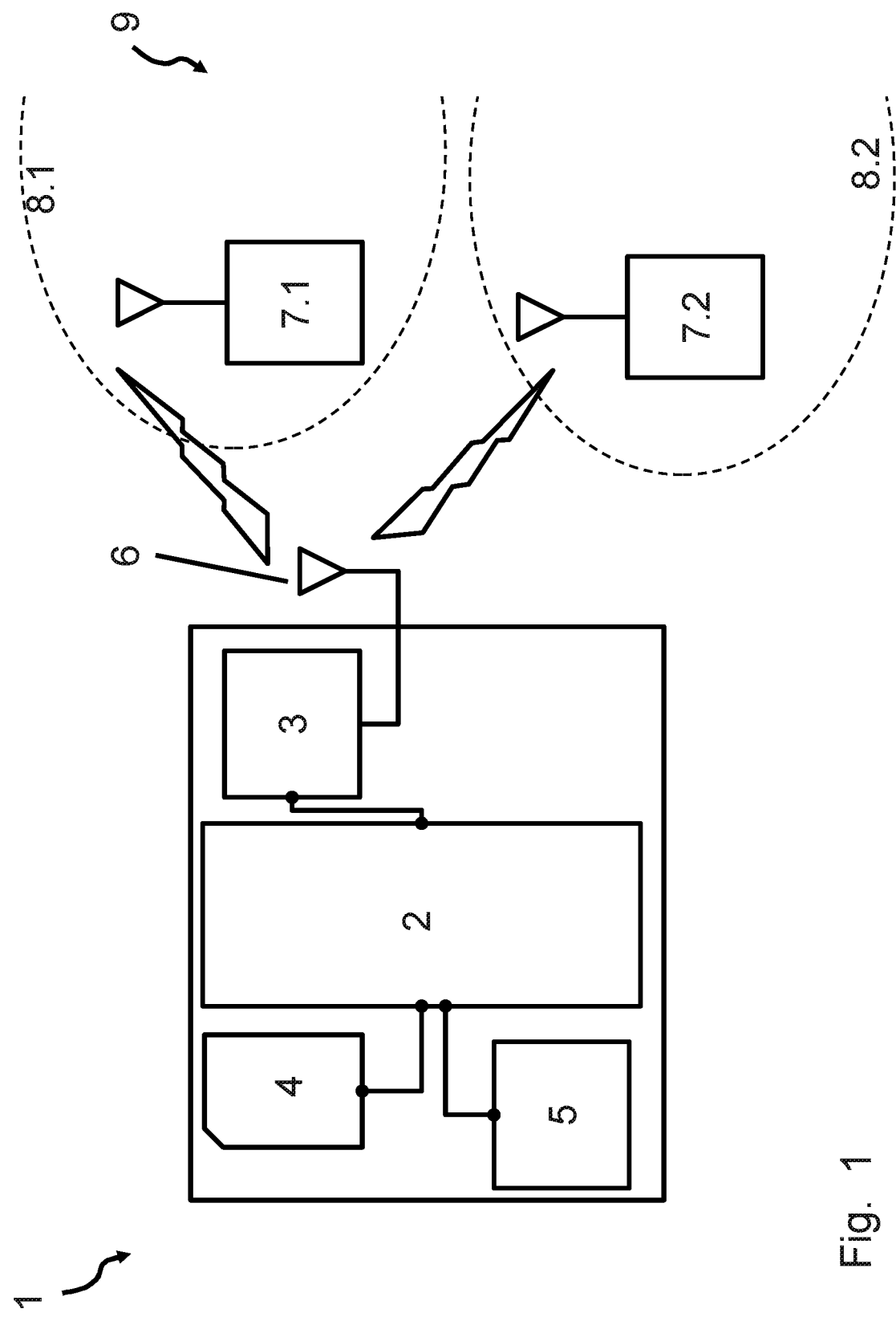
FIG. 1 represents a wireless device of the type to which the present invention is applied as an embodiment.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. The following detailed description is, therefore, not to be taken in a limiting sense, and the scope of the present invention is defined only by the appended claims, appropriately interpreted, along with the full range of equivalents to which the claims are entitled. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention.

For clarity, only those elements and steps which are useful to the understanding of the present invention have been shown in the drawings and will be described. Moreover, when an action is said to be performed by a device, it is in fact executed by a microprocessor in this device controlled by instruction codes recorded in a program memory on the said device.

FIG. 1 schematically shows a wireless device 1 of the type to which the present invention is applied as an embodiment. This wireless device 1 comprises a couple of units which also can be arranged in single units for more functions than described. The whole wireless device 1 is controlled by a control unit 2, which is typically a normal processor capable of running software on it. Connected to the control unit 2 is the communication unit 3. According to the invention it is a first option that it is a monolithic device with dedicated baseband chips as communication unit 3 which is controlled by control unit 2. Alternatively the communication unit 3 can as second option also comprise a machine-to-machine module (M2M module), which consists of its own processor and is able to handle a couple of procedure steps according to this invention and/or preferred embodiments as well.

Out of simplicity reasons it is for this example assumed, without limiting the scope of the invention, that the control logic is concentrated in control unit 2. The wireless device 1 further comprises a storage unit 4. The storage unit 4 is in case of this example a SIM card capable of storing all authentication and authorization data associated to the subscription of the user of the wireless device 1. Parts of the datasets stored in storage unit 4 are in particular network access rights which are used to qualify a detected radio access network.

Further the wireless device 1 comprises a location measuring unit 5. This is used for embodiments of present invention where it needs to be detected if the wireless device 1 is static or has moved since the last measurement. In this particular case the location measuring unit 5 is implemented as GPS module or any other unit capable of location detection based on satellite signals. It is in alternative embodiments also possible to use signalling information from the wireless cellular network, in particular about the network node, to detect an indication of the location. By using measuring one or more pilot channels of different network nodes the position can be derived, by analyzing line-of-sight conditions, i.e. the signal of a pilot channel is reduced by 40+10 log (distance in meter) assuming a constant emission of the signal of i.e. 33 dBm.

In this case location measuring unit 5 would preferably be part of communication unit 3 or directly linked to it.

Finally the wireless device 1 comprises an antenna 6, which is the hardware interface to the wireless link. The antenna 6 is preferably connected to communication unit 3. Further control of the antenna 6 is additionally possible through control unit 2, whereby it does not matter if this is implemented through a direct connection or this is done through communication unit 3. Through the antenna 6 and the communication unit 3 the wireless device 1 is now capable of receiving signalling from different network nodes 7.1, 7.2. These network nodes 7.1, 7.2 are associated to different radio access networks 8.1, 8.2. These radio access networks 8.1, 8.2 belong to one wireless cellular network 9. In response the wireless device 1 is further capable of sending information to the respective network nodes 7.1, 7.2, typically only one at a time.

The different radio access networks 8.1, 8.2 of the wireless cellular network 9 typically represent different access technologies. It is very common that a wireless cellular network comprises a 2G, a 3G and a 4G radio access network. In this case the network nodes would be a base station in the 2G case, a NodeB in the 3G case and an eNodeB in the 4G case. Further network entities behind the network node provide a different architecture. Nevertheless they are interconnected in the wireless cellular network by means of the core network (CN).

In this embodiment the wireless device 1 acts in a connected state, this means that it is assigned to exactly one network node, in this example 7.1. Due to that it is defined in which radio access network, in this case 8.1, it is acting, and therefore which access technology is used, for example 2G.

Figure 2:
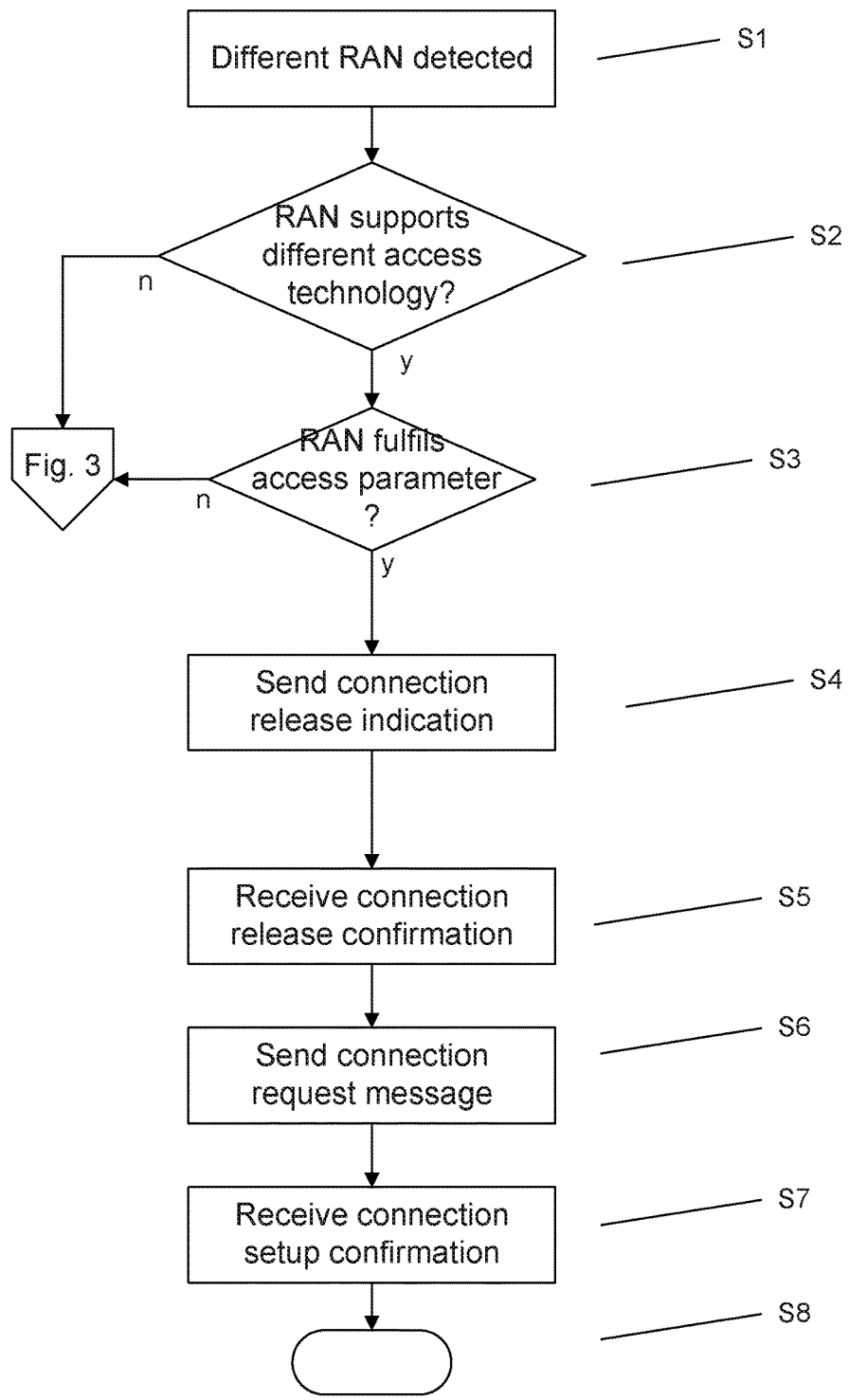
FIG. 2 shows a flowchart of a particular form of an embodiment.

FIG. 2 shows a flowchart depicting method steps according to an exemplary embodiment of the invention. The method steps are in particular executed within the control unit 2 or the communication unit 3 of the wireless device 1. The process starts with the wireless device 1 being connected to a first radio access network 8.1, by means of the network node 7.1 associated to said radio access network 8.1 of the wireless cellular network 9.

In step S1 it is now checked if other radio access networks (RAN) are detected. This does not necessary mean that a signalling from these radio access networks can be retrieved, but that the wireless device 1 knows about the potential existence of at least one different radio access network within the wireless cellular network. One option is to decode dedicated neighbor cell signalling from the first radio access network 8.1, which comprises information regarding network nodes 7.1, 7.2 and its respective radio access networks.

There are different reasons how the described process can be triggered. One reason is that the wireless cellular network urged the wireless device 1 to switch from a currently used radio access network to another one, which is not in line with the service expectations of the wireless device 1. As a reaction to this switch caused by the wireless cellular network the shown process of the invention is launched.

Another possible reason can be a simple time trigger. Further it can be that the wireless device 1 changes its service expectations, e.g. that after a while of voice communication, which can be easily handled within 2G, a couple of data up- or downloads are planned. For that it is preferable to switch to a 3G or 4G network. In the present embodiment it is assumed that the expiry of a timer triggered the process shown in FIG. 2.

For the following it is assumed that one radio access network different from the first radio access network 8.1, the wireless device 1 is currently operating in, is detected. This is hereinafter the second radio access network 8.2, for example a 3G or a 4G radio access network.

In step S2 it is to be checked if the second radio access network supports a different access technology than the first radio access network. Only in case of a change, in particular an improvement in terms of access technology it makes sense for the wireless device 1 to switch to another radio access network.

This check is possible in particular by means available in the wireless device 1. If it is known that the wireless cellular network only provides radio access networks with different access technologies then no real additional step is to be conducted except to determine that the second radio access network as such is different from the first radio access network. In case of a detection of the second access networks by dedicated neighbour cell signalling the access technology of the second radio access network can be derived from said signalling.

If said condition in S2 is met then the process moves on to step S3, otherwise the process can end here and start anew once a respective trigger appears. According to the depicted flow chart it is in particular designed that way that the procedure described in FIG. 3 (later described) will then be executed.

Within step S3 it is now checked if the second radio access network 8.2 fulfils a predefined set of access parameters. These access parameters can include a wide variety of requirements that need to be tested here.

At first it is preferred to check if the second radio access network is available in the sense that the wireless device 1 can decode signalling received from a network node 7.2 of the second radio access network 8.2.

There are different means to detect this condition. One is to perform a network scan. Another one is to receive information as part of the signalling received from a network node 7.1 of the first radio access network 8.1, according to dedicated neighbour cell signalling, or for the case of LTE automatic neighbourhood resolution (ANR). With that, information are provided which helps the wireless device 1 to identify what cells of what radio access networks are in the surrounding of the current cell.

Another type of access parameter to be checked is preferably the condition if the wireless device 1 is entitled to access the second radio access network 8.2. The entitlement can be retrieved from information stored in storage unit 4. There are situations that a wireless device 1 is subscribed to 2G and 3G network, but not to 4G/LTE. This has reasons in the tariff structure of the operator of the wireless cellular network 9, wherein such subscriptions with limited access to access technologies are cheaper. It is therefore advantageous to filter out such radio access networks where the wireless device 1 cannot according to the subscription register to, in order to avoid attempts to access this radio access network later.

Further it is possible to restrict the whole process only to those situations where the second radio access network 8.2 is the preferred radio access network according to the information stored on the storage unit 4. There is the possibility to have defined one radio access network as 'preferred', and this representation is also stored in the SIM card 4. This information is in particular helpful for a first registration in the wireless cellular network 9, but it can also be used in the present case. With this access parameter, the whole process is only executed in a situation when the wireless device 1 is operating in a radio access network different from the preferred radio access network.

If the set of access parameters defined for the exemplary embodiment is fufilled by the second radio access network 8.2, then the process moves on to the next step. Otherwise the process ends here. As described above it is advantageous to execute the steps depicted in FIG. 3 in case that the second radio access network 8.2 does not fulfill the set of access parameters.

In step S4 now a connection release indication is sent to the network node 7.1 of the first radio access network 8.1.

This connection release indication is typically represented by a SCRI message. Its task is to tell the network node 7.1, that no further communication is to be expected and therefore the running connection is to be ended earlier than the network node 7.1 would expect.

In response to the SCRI message the network node 7.1 sends a confirmation that the connection is released, which is received at the wireless device 1 in step S5. This ends the connection of the wireless device 1 with the first radio access network 8.1.

Now the wireless device 1 sends in step S6 a connection request message to a network node 7.2 of the second radio access network 8.2. This is a standardized process of building up a connection with a certain radio access network. The following steps on side of the wireless cellular network 9 are dependent of the conditions of the second radio access network 8.2. In the normal process the setup of the connection is successful and indicated to the wireless device 1 through the network node 7.2, as depicted in step S7.

The wireless device 1 can now operate the requested connection in the desired radio access network 8.2, which concludes the procedure according to preferred embodiments of the inventive method (S8).

Figure 3:
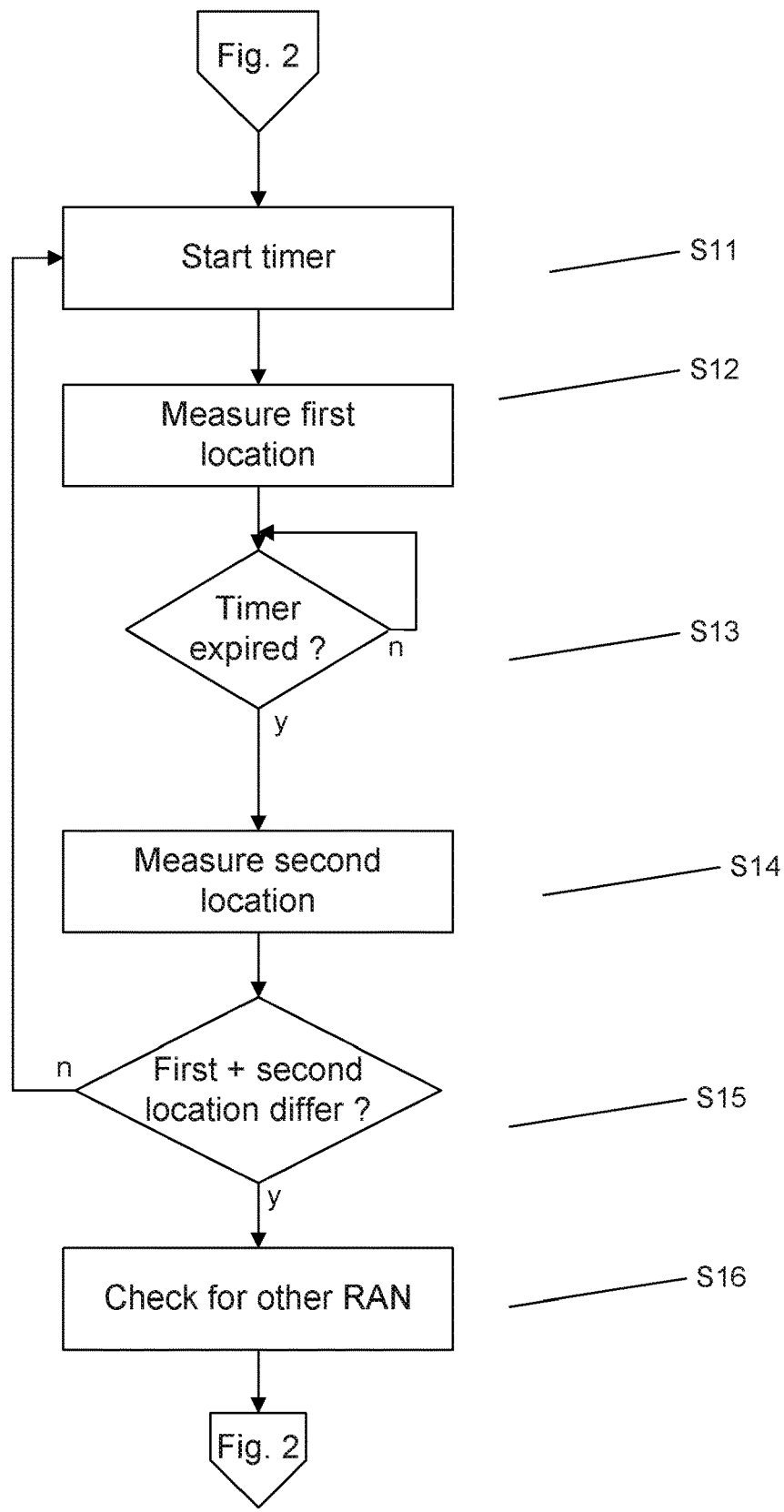
FIG. 3 shows a flowchart of a particular form of an embodiment.

FIG. 3 shows a preferred embodiment for the case that in step S2 and/or S3 no radio access network could be detected. The goal of this method is to avoid frequent unnecessary and futile attempts to change the radio access network.

For this in step S11 first a timer is started. The longer the timer the less attempts are there. Now in step S12 an indication of the current location of the wireless device 1 is measured. This can in particular be done by means of location measuring unit 5. Steps S11 and S12 can also be conducted in another order.

Now it needs to wait until the timer expires in S13. Preferably the wireless device 1 can do different tasks during that time, insofar the timer can be regularly checked or used as a kind of trigger or event to jump into the next step, once the timer expires.

In that case step S14 is executed, during which a second time an indication of the current location of the wireless device 1 is measured. This is preferably done with the same means as the first location measurement.

Now it has in step S15 to be checked, if the first and second measured locations materially differ. This is only the case when the wireless device 1 has moved since the first measurement. To materially differ means in particular that the wireless device 1 has even moved so far that the situation in terms of availability of cells and/or radio access networks can have changed.

There are a couple of possibilities to detect that. A first one is a constant distance that the wireless device 1 has been moved since the first location measurement.

Another option would be to detect that the current cell or an average cell has been left. Insofar with respect to the architecture of the wireless cellular network 9 this can mean that in some areas, e.g. in rural regions with large cells, a longer distance need to be travelled to detect that the measured locations materially differ, while in other areas, like cities with smaller cells, a shorter distance would be detected as materially differing movement of the wireless device 1.

Once this condition is fulfilled in step S15 (case y), the procedure can move on to step S16 to again check for another radio access network, and to start the process depicted in FIG. 2 anew. Otherwise (case n), the timer is started again and the process depicted on FIG. 3 is replayed.

The invention claimed is:

1. Method to operate a wireless device in a wireless cellular network having plural radio access networks carrying different radio access technologies, the wireless device comprising a communication unit and at least one storage element storing internally network access rights, the communication unit being configured to communicate to a network node being part of the wireless cellular network, the network node belonging to a first radio access network, the method comprising the steps for the communication unit of:
   determining whether a second radio access network supports a different radio access technology than the first radio access network,
   only in response to determining that the second radio access network supports a different radio access technology than the first radio access network, detecting if the second radio access network of said wireless cellular network fulfills a predefined set of access parameters, wherein said set of access parameters comprises the requirements that the wireless device is entitled to access the second radio access network, that said network access rights indicate that the second radio access network is configured as a preferred radio access network and that the second radio access network is available,
   storing measurements indicating the availability of the second radio access network, prior to the step of detecting whether the second radio access network fulfills the predefined set of access parameters, wherein said availability of the second radio access network is determined by accessing said stored previous measurements, and
   when the detection step indicates that said second radio access network fulfills said set of access parameters: sending a connection release indication to the network node, receiving from the network node a connection release confirmation message, and sending a connection request message to the wireless cellular network with selection of said second radio access network.

2. Method according claim 1, wherein connection release indication is a signaling connection release indication (SCRI) message.

3. Method according to claim 1, wherein the availability of the second radio access network is determined by measuring signalling from network nodes belonging to neighbour cells.

4. Method according to claim 1, wherein the availability of the second radio access network is determined by executing a network scan.

5. Method according to claim 1, wherein if the detection step indicates that no second radio access network fulfills said set of access parameters, the method comprises the steps of:
   starting a timer,
   measuring a first indication of the current location,
   after expiry of the timer measuring a second indication of the current location,
   if the first and second indication of the current location materially differ,
   repeating the detection step, and
   otherwise restarting the timer.

6. Wireless device configured to operate in a wireless cellular network having plural radio access networks carrying different radio access technologies, the wireless device comprising a communication unit and at least one storage element storing internally network access rights, the communication unit being configured to communicate to a network node being part of the wireless cellular network, the network node belonging to a first radio access network, wherein the wireless device is configured:
- to determine whether a second radio access network supports a different radio access technology than the first radio access network, to detect,
- only in response to determining that the second radio access network supports a different radio access technology than the first radio access network, if the second radio access network of said wireless cellular network fulfills a predefined set of access parameters, wherein said set of access parameters comprises the requirements that the wireless device is entitled to access the second radio access network, that said network access rights indicate that the second radio access network is configured as a preferred radio access network and that the second radio access network is available,
- to store measurements indicating the availability of the second radio access network, prior to the step of detecting whether the second radio access network fulfills the predefined set of access parameters, wherein said availability of the second radio access network is determined by accessing said stored previous measurements,
- when the detection indicates that said radio second radio access network fulfills said set of access parameters, the communication unit is configured: to send a connection release indication to the network node, to receive from the network node a connection release confirmation, and to send a connection request message to the wireless cellular network with selection of said second radio access network.

7. Wireless device according to claim 6, configured to determine the availability of the second radio access network by measuring signalling from network nodes belonging to neighbour cells.

8. Wireless device according to claim 6, configured to determine the availability of the second radio access network by executing a network scan.

9. Wireless device according claim 6, configured to, if said detection indicates that no second radio access network fulfills said set of access parameters,
- start a timer,
- measure a first indication of the current location,
- after expiry of the timer measure a second indication of the current location,
- if the first and second indication of the current location materially differ,
- repeat said detection, and
- otherwise restart the timer.

* * * * *